(No Model.)

F. A. WESSEL.
SYSTEM OF ELECTRICAL DISTRIBUTION.

No. 370,434. Patented Sept. 27, 1887.

ATTEST:
J. A. Mundle
John P. Wright

INVENTOR:
Ferdinand A. Wessel
By Edward P. Thompson
Attorney

N. PETERS, Photo-Lithographer, Washington, D. C.

UNITED STATES PATENT OFFICE.

FERDINAND A. WESSEL, OF BROOKLYN, NEW YORK.

SYSTEM OF ELECTRICAL DISTRIBUTION.

SPECIFICATION forming part of Letters Patent No. 370,434, dated September 27, 1886.

Application filed March 17, 1887. Serial No. 231,229. (No model.)

*To all whom it may concern:*

Be it known that I, FERDINAND A. WESSEL, a citizen of the United States, and a resident of Brooklyn, county of Kings, and State of New York, have invented certain new and useful Improvements in Systems of Electrical Distribution, of which the following is a specification.

My invention relates to a system of electrical distribution to be employed for the purpose of automatically regulating the currents of incandescent electric lamps or similar translating devices, such as electric-arc lamps.

Figure 1:
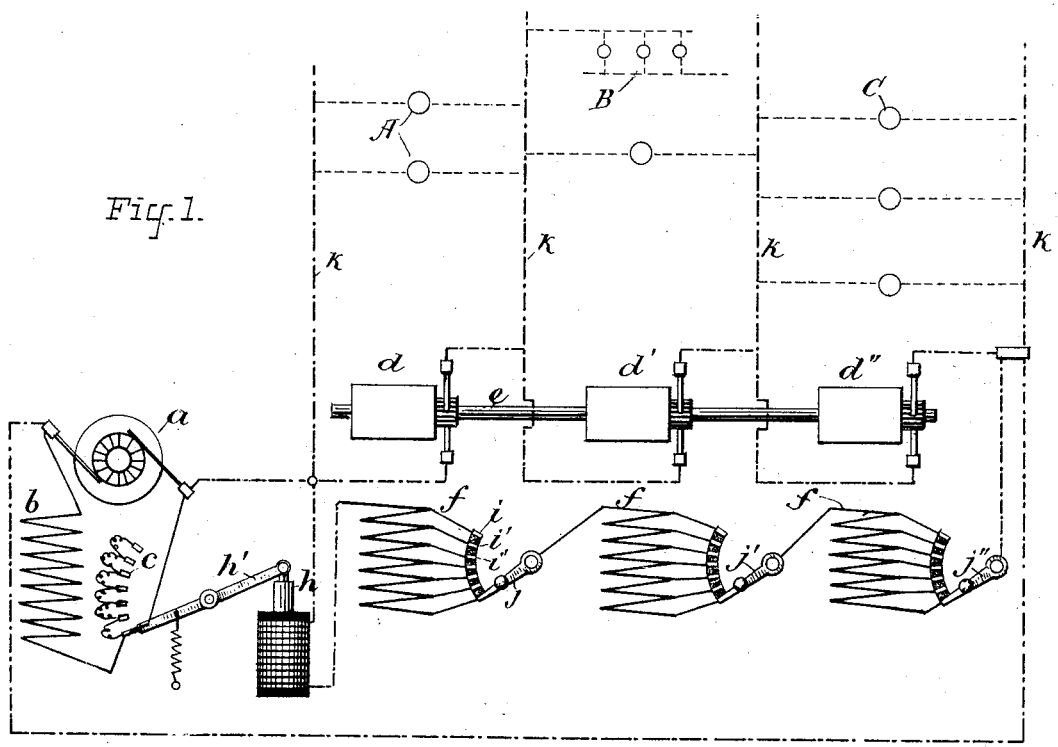
Figure 2:
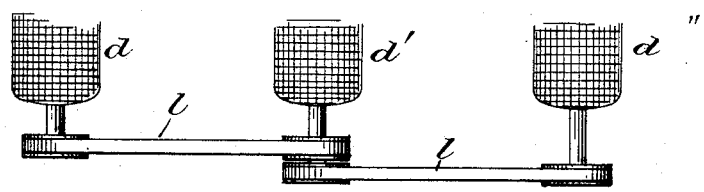

Figure 1 illustrates my system, and Fig. 2 shows a modified form of connecting the machine.

The system consists of the combination of a dynamo-electric machine, $a$, having a field-magnet, $b$, a rheostat, $c$, in circuit with said field-magnet, electric motors $d$ $d'$ $d^2$, having a common or single shaft, $e$, and located in series with said dynamo and with each other, field-magnets $f$ for said motors, in series with each other and with a solenoid, whose core $h$ has operating connection through a lever, $h'$, with the said rheostat, the last-mentioned field-magnets having their coils in sections whose terminals $i$ $i'$ $i^2$ are adapted to be, one at a time, in circuit with an adjustable switch, $j$, branch circuits $k$ from each motor containing incandescent electric lamps in multiple arc. The group of lamps A are in a branch or shunt circuit with the motor $d$. The lamps B are in shunt with the motor $d'$, and the lamps C are in shunt-circuit with the motor $d^2$. If one or more lamps of one of the groups be cut out of circuit, the remainder of the lamps in the same or in the other groups will remain practically of the same candle-power, because the action of the motors generates a counter electro-motive force which tends to neutralize the larger part of the increase of current.

If it is desired to have one group of lamps at a different candle-power from that of the other lamps, it is only necessary to adjust one of the switches $j$, because by that means the speed of the motors is varied, and therefore the counter electro-motive force. While such an adjustment is being effected the dynamo-electric machine automatically regulates itself, because, when the resistance of the motors' field-magnets diminishes, for instance, the solenoid pulls down its core and introduces an increased resistance in circuit with the field-magnet of the dynamo-electric machine.

It is evident that the common shaft may be replaced by an equivalent mechanism—such, for instance, as belts $l$, as shown in Fig. 2. Further, the regulator for the generator may be replaced by any similar regulator.

I claim as my invention—

1. In a system of electrical distribution, the combination of a dynamo-electric machine having an automatically-variable field-magnet, electric motors having a common shaft and located in series with said machine, variable fields to said motors, and incandescent electric lamps or similar translating devices in shunt-circuits to said motors, substantially as and for the purpose described.

2. In a system of electrical distribution, the combination of a dynamo-electric machine, electric motors in series with said machine, and incandescent electric lamps in shunt-circuits to said motors, the said motors having but one common shaft, substantially as and for the purpose described.

3. In a system of electrical distribution, the combination of a dynamo-electric machine, a number of electric motors having a common shaft and in series with said dynamo-machine, and an equal number of incandescent electric lamps or groups of said lamps or similar translating devices in series with said dynamo-machine, substantially as and for the purpose described.

4. In a system of electrical distribution, the combination of a dynamo-electric machine, electric motors having their armatures in series with said machine, the said motors being provided with a common shaft and having their field-magnets located in series with each other and in shunt to all the motors, and incandescent electric lamps or similar translating devices in series with each other and in shunt-circuits to said motors, substantially as and for the purpose described.

5. In a system of electrical distribution, the combination of a dynamo-electric machine, electric motors in series with said machine and having a common shaft, a solenoid in circuit with the said motors' field-magnets, a rheostat having operating connection with the core of said solenoid and in circuit with the field-magnet of said machine, the field-magnet of the motors having a variable number of coils in circuit, and incandescent electric lamps being in shunt-circuit to the individual motors, substantially as and for the purpose described.

6. In a system of electrical distribution, the combination of a dynamo-electric machine, motors having a common shaft in series with each other, groups of lamps in shunt-circuit with each motor, a regulator for each motor, and an automatic regulator for the dynamo-machine.

7. In a system of electrical distribution, the combination of a dynamo-electric machine, motors having a common shaft in series with each other, groups of lamps in shunt-circuit with each motor, a regulator for each motor, and a regulator for the dynamo-machine.

8. In a system of electrical distribution, the combination of an electrical generator, a number of electric motors mechanically coupled together and in circuit with said generator, and an equal number of groups of translating devices in shunt with said motors.

In testimony that I claim the foregoing as my invention I have signed my name, in presence of two witnesses, this 12th day of February, 1887.

FERDINAND A. WESSEL.

Witnesses:
EDWARD P. THOMPSON,
JOHN P. WRIGHT.